US012675740B2

(12) United States Patent
Kuroda

(10) Patent No.: US 12,675,740 B2
(45) Date of Patent: Jul. 7, 2026

(54) TRAINING APPARATUS AND TRAINING METHOD

(71) Applicant: SONY GROUP CORPORATION, Tokyo (JP)

(72) Inventor: Kan Kuroda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 196 days.

(21) Appl. No.: 18/560,948

(22) PCT Filed: Feb. 25, 2022

(86) PCT No.: PCT/JP2022/007801

§ 371 (c)(1),
(2) Date: Nov. 15, 2023

(87) PCT Pub. No.: WO2022/254829

PCT Pub. Date: Dec. 8, 2022

(65) Prior Publication Data

US 2024/0256971 A1      Aug. 1, 2024

(30) Foreign Application Priority Data

Jun. 4, 2021      (JP) ................................. 2021-094464

(51) Int. Cl.
*G06F 40/279*          (2020.01)
*G06F 40/40*           (2020.01)
*G06N 20/00*           (2019.01)

(52) U.S. Cl.
CPC ........... *G06N 20/00* (2019.01); *G06F 40/279* (2020.01); *G06F 40/40* (2020.01)

(58) Field of Classification Search
None
See application file for complete search history.

(56) References Cited

U.S. PATENT DOCUMENTS

| | | | |
|---|---|---|---|
| 10,217,059 B2 * | 2/2019 | Yang ..................... | G06F 40/186 |
| 2017/0004121 A1 * | 1/2017 | Pino ..................... | G06F 40/289 |
| 2019/0042663 A1 | 2/2019 | Gupta | |

(Continued)

FOREIGN PATENT DOCUMENTS

| | | |
|---|---|---|
| CN | 1811915 A | 8/2006 |
| JP | 2003-255989 A | 9/2003 |

(Continued)

OTHER PUBLICATIONS

Improved Parsing of User Queries in a Remote Network Management Platform Using Extended Context-Free Grammar Rules, CA 3055973 A1, Vertsel Aliaksei (Year: 2020).*

(Continued)

*Primary Examiner* — Paras D Shah
*Assistant Examiner* — Ali M Hassan
(74) *Attorney, Agent, or Firm* — CHIP LAW GROUP

(57) ABSTRACT

Provided is a training apparatus that includes an acceptance unit that acquires language data obtained by describing elements constituting sentences in a replaceable form, and accepts designation of a method for expanding the language data and creating the sentences and a training unit that trains a model related to a natural language using the sentences created by expanding the language data based on the designation accepted by the acceptance unit.

11 Claims, 12 Drawing Sheets

(56) References Cited

U.S. PATENT DOCUMENTS

| | | | |
|---|---|---|---|
| 2019/0088250 A1 | 3/2019 | Kim | |
| 2021/0056266 A1* | 2/2021 | Ma | G06F 16/353 |
| 2021/0398159 A1* | 12/2021 | Nagasaka | G06Q 30/0215 |
| 2022/0165257 A1* | 5/2022 | Singh | G06F 40/284 |

FOREIGN PATENT DOCUMENTS

| | | | |
|---|---|---|---|
| JP | 2005-024797 A | 1/2005 | |
| JP | 2009-163109 A | 7/2009 | |

OTHER PUBLICATIONS

International Search Report and Written Opinion of PCT Application No. PCT/JP2022/007801, issued on May 17, 2022, 09 pages of ISRWO.
Noura Mahda et al., "VISH: Does Your Smart Home Dialogue System Also Need Training Data?", 2020, pp. 171-187.

* cited by examiner

| SENTENCE ID | CORRESPONDING INTENTION | SENTENCE BODY | ... |
|---|---|---|---|
| A01 | UNLOCK KEY | "CHECK THAT DOOR OF {ROOM} OF {HOUSE} IS LOCKED" | ... |
| A02 | UNLOCK KEY | "MAKE SURE THAT DOOR OF {ROOM} OF {HOUSE} IS LOCKED" | ... |
| A03 | CHECK WEATHER | TELL ME WHETHER AT {PLACE} | ... |
| A04 | DO NOT CORRESPOND TO ANY ONE OF INTENTIONS | MEAL IS DELICIOUS | ... |
| ... | ... | ... | ... |

| RULE ID | DERIVED CONTENTS | ... |
|---|---|---|
| HOUSE | MY HOUSE, HOUSE, HOME, MY HOME | ... |
| ROOM | EVERYONE'S ROOM, GUEST ROOM | ... |
| ... | ... | ... |

TRAINING APPARATUS AND TRAINING METHOD

CROSS REFERENCE TO RELATED APPLICATIONS

This application is a U.S. National Phase of International Patent Application No. PCT/JP2022/007801 filed on Feb. 25, 2022, which claims priority benefit of Japanese Patent Application No. JP 2021-094464 filed in the Japan Patent Office on Jun. 4, 2021. Each of the above-referenced applications is hereby incorporated herein by reference in its entirety.

FIELD

The present disclosure relates to a training apparatus, a training method, and a training program that perform machine learning related to language processing.

BACKGROUND

With the spread of smartphones and smart speakers, dialogue systems for making appropriate responses to users in response to utterances accepted from users, user actions, and the like have been widely used. Such dialogue systems use a training model generated by performing machine learning on utterances, text data, and the like.

For example, there is known a method for using sentences described in an Extended Backus Naur Form (EBNF) obtained by extending a Backus Naur Form (BNF) that is a predetermined grammatical rule for model generation and phoneme feature value extraction of a dialogue system.

CITATION LIST

Patent Literature

Patent Literature 1: JP 2003-255989 A

SUMMARY

Technical Problem

The conventional techniques can efficiently collect and use text data such as sentences used for training the dialogue system.

However, when, for example, new training is performed to use a natural language model trained by a method such as a Recurrent Neural Network (RNN) or Transformer for specific use such as a discriminator or the like, data described in the BNF or the like cannot be used as training data as it is. That is, data described in the BNF or the like is described according to a specific rule, and therefore it is difficult to use the data as training data of machine learning. On the other hand, a problem occurs that, in a case where data described in the BNF or the like is expanded and individual sentences are created, the number of sentences becomes enormous, and training takes too much time.

Therefore, the present disclosure proposes a training apparatus, a training method, and a training program that can efficiently perform training using data described according to a predetermined grammatical rule.

Solution to Problem

In order to solve the above problems, a training apparatus according to an embodiment of the present disclosure includes an acceptance unit that acquires language data obtained by describing an element constituting a sentence in a replaceable form, and accepts designation of a method for expanding the language data and creating the sentence, and a training unit that trains a model related to a natural language using the sentence created by expanding the language data based on the designation accepted by the acceptance unit.

BRIEF DESCRIPTION OF DRAWINGS

FIG. 1 is a view illustrating an outline of information processing according to a first embodiment.

FIG. 4 is a view illustrating an example of a language data storage unit according to the first embodiment.

FIG. 5 is a view illustrating an example of a replacement rule storage unit according to the first embodiment.

DESCRIPTION OF EMBODIMENTS

Figure 2:
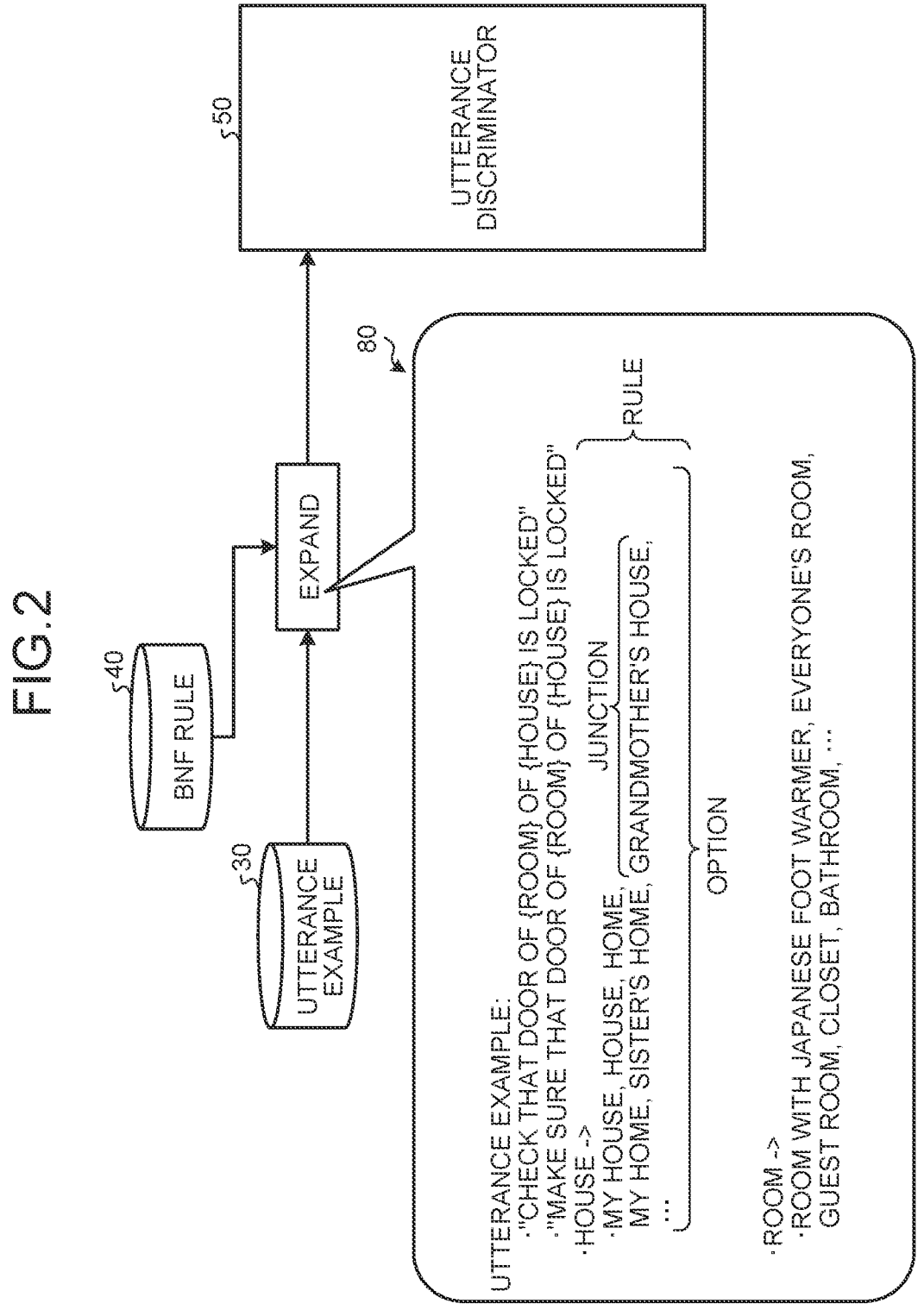
FIG. 2 is a view (1) for describing expansion processing according to the first embodiment.

Hereinafter, embodiments will be described in detail with reference to the drawings. Note that, in each of the following embodiments, the same components will be assigned the same reference numerals, and redundant description will be omitted.

Furthermore, the present disclosure will be described in order of items described below.

1. First Embodiment
1-1. Outline of Information Processing According to First Embodiment
1-2. Configuration of Training Apparatus According to First Embodiment
1-3. Procedure of Processing According to First Embodiment
1-4. Modified Example According to First Embodiment
2. Second Embodiment
2-1. Outline of Information Processing According to Second Embodiment
2-2. Configuration of Training Apparatus According to Second Embodiment
2-3. Procedure of Processing According to Second Embodiment 2-4. Modified Example According to Second Embodiment 3. Other Embodiment 4. Effect of Training Apparatus According to Present Disclosure 5. Hardware Configuration

1. First Embodiment

1-1. Outline of Information Processing According to First Embodiment

Figure 1:
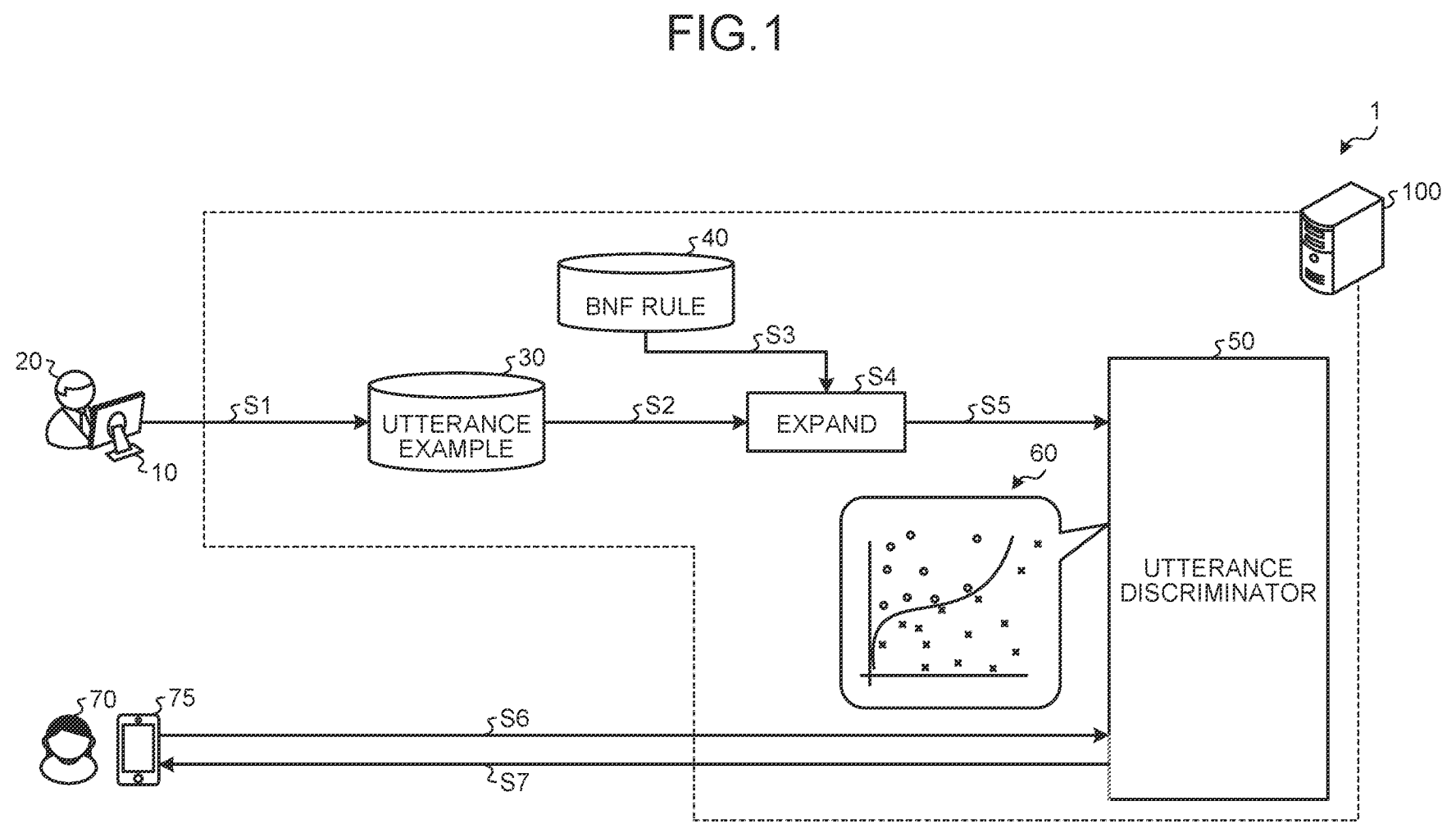

An example of information processing according to the first embodiment of the present disclosure will be described with reference to FIG. 1. FIG. 1 is a view illustrating the outline of the information processing according to the first embodiment. The information processing according to the first embodiment is executed by a training system 1 illustrated in FIG. 1.

As illustrated in FIG. 1, the training system 1 includes a training apparatus 100, a setter terminal 10, and a user terminal 75. The training apparatus 100 is an example of an information processing apparatus that executes training processing according to the present disclosure, and is, for example, a server. The setter terminal 10 is an information processing apparatus that is used by a setter 20 who makes settings related to machine learning, and is, for example, a personal computer. The user terminal 75 is an information processing apparatus that is used by a user who uses an utterance discriminator 50 provided by the training apparatus 100, and is, for example, a smartphone or a tablet terminal.

Note that each apparatus in FIG. 1 conceptually illustrates functions of the training system 1, and can take various modes according to the embodiments. For example, the setter terminal 10 may be one or two or more terminal apparatuses. Furthermore, the setter terminal 10 and the user terminal 75 may be the same terminal.

In the example illustrated in FIG. 1, the training apparatus 100 includes the utterance discriminator 50 that is a natural language model trained in advance by a method such as an RNN or Transformer. To use the utterance discriminator 50 for specific use, the setter 20 makes settings for updating the utterance discriminator 50 using new training data. For example, the setter 20 trains the utterance discriminator 50 to obtain a discriminator that discriminates whether or not an utterance uttered by a user 70 indicates some intention. More specifically, the setter 20 sets machine learning to obtain a model that, in a case where the user 70 has made an utterance related to "locking", outputs a determination result indicating whether the utterance of the user 70 input to the utterance discriminator 50 includes an intention to "make sure that the door is locked" or does not include this intention.

In a case where such training is performed, the training apparatus 100 needs a sufficient amount of utterance examples to improve accuracy of utterance discrimination. Furthermore, in a case where new training is performed using a model pre-trained by a method such as the RNN or Transformer, data used for this training needs to have the same format as that at the time of pre-training. Here, as a method for describing utterance contents, that is, a sentence, there is a method such as the Backus Naur Form (BNF) for describing elements constituting the sentence in a replaceable format. Such a method can expand the elements constituting the sentence into a plurality of sentences, and consequently create a large number of sentences from a small amount of information. Consequently, if an utterance example described in the BNF or the like can be used for training, the setter 20 can efficiently advance training processing. However, if the format described according to a specific rule such as the BNF is kept as it is, it is not possible to perform new training using a model pre-trained using normal sentences. On the other hand, a problem occurs that, in a case where data described in the BNF or the like is expanded and individual sentences are created, the number of sentences becomes enormous, and training takes too much time. That is, the training processing of the natural language model has a task of performing efficient training using data described according to a predetermined grammatical rule.

Therefore, by executing the training processing according to the present disclosure, the training apparatus 100 can efficiently train a model using data described according to a predetermined grammatical rule such as the BNF. Hereinafter, an outline of the training processing according to the present disclosure will be described according to a flow with reference to FIG. 1 illustrating a schematic block diagram of the training processing according to the present disclosure.

As illustrated in FIG. 1, the setter 20 sets training processing to the training apparatus 100 via the setter terminal 10 (step S1). At this time, it is assumed that the setter 20 uses utterance examples 30 held in advance by the training apparatus 100 for training. In the example in FIG. 1, the utterance example 30 is data described according to a predetermined grammatical rule such as the BNF.

The training apparatus 100 acquires the utterance examples 30 according to an instruction of the setter 20 (step S2). Furthermore, the training apparatus 100 acquires a BNF rule 40 that is a grammatical rule applied to the utterance examples 30 (step S3). Furthermore, the training apparatus 100 expands the utterance examples 30 according to the BNF rule 40, and generates sentences that can be used for training (step S4).

Here, expansion of data described in the BNF will be described with reference to FIG. 2. FIG. 2 is a view (1) for describing expansion processing according to the first embodiment. For example, it is assumed that, as indicated in a data example 80, examples of the utterance examples 30 are data such as "check that the door of {ROOM} of {HOUSE} is locked" and "makes sure that the door of {ROOM} of {HOUSE} is locked". "{HOUSE}" is one of elements constituting a sentence, and has a plurality of options. Furthermore, the individual features of the options are also referred to as junctions. Furthermore, such an expandable element is referred to as a rule. That is, the data "check that the door of {ROOM} of {HOUSE} is locked" includes two rules of "{HOUSE}" and "{ROOM}".

"{HOUSE}" is an element that indicates a concept of a house, and features such as "my house, house, home, my home, sister's home, grandmother's house, and . . . " constitute options. Individual terms (features) such as "my house", "house", and "grandmother's house" indicating the concept of the house are junctions. This indicates that the element "{HOUSE}" is expandable to the number of options, in other words, the number of features defined as junctions according to a rule associated with the element.

Similarly, features such as "room with Japanese foot warmer, everyone's room, guest room, closet, bath, and . . . " constitute options for "{ROOM}". "{ROOM}" can also be expanded a number of times corresponding to the number of features defined as junctions.

For example, the data "check that the door of {ROOM} of {HOUSE} is locked" is expandable as sentences the number of which corresponds to the number of combinations of the numbers of options of the individual elements such as "check that the door of the room with Japanese foot warmer of my house is locked" and "check that the door of the closet of the home is locked". That is, the number of times of expansion of data described in the BNF can be calculated based on the number of times of appearance of rules in sentence examples and the number of individual options.

Describing the rule again according to a general BNF description method, "A:=ii|jj|kk" indicates that "there are three options (ii, jj, kk) derived from a rule A", that is, the number of times of expansion of the rule A is three. In a case of, for example, a sentence example X "tomorrow is A", the rule A appears once, and therefore the total number of times of expansion of the sentence example X is three. Furthermore, in a case of, for example, "sentence example Y: "tomorrow is A, A, and A"", the rule A appears three times, and therefore the total number of times of expansion of the sentence example Y is 3*3*3 (=33), i.e., 27.

Furthermore, when another rule appears in the junction derived by a certain rule, the total number of times of expansion of this another rule is multiplied on the number of times of expansion of the junction. For example, assume that there is a rule "B:=m A m|ii". In this case, the number of times of expansion of a rule B is obtained by adding "ii" that is a junction of an independent option to 3 of the number of times of expansion of the rule A, and therefore the number of times of expansion is four. For example, in a case of "sentence example Z: "B is A"", 3 of the number of times of expansion of the rule A is multiplied with 4 of the number of times of expansion of the rule B, and therefore the total number of times of expansion of the sentence example Z is 3*4, i.e., 12.

That is, the total number of times of expansion "$D_{all}$" in a case where language data described in the BNF is expanded can be expressed as a polynomial that uses the number of times of expansion "$D_a$" of the rule A, the number of times of expansion "$D_b$" of the rule B, and the like. When, for example, the language data includes the sentence example X, the sentence example Y, and the sentence example Z, the total number of times of expansion is (the number of times of expansion of the sentence example X)+(the number of times of expansion of the sentence example Y)+(the number of times of expansion of the sentence example Z), and is expressed by a polynomial "$D_{all}=D_a+D_a^3+D_b*D_a$". Note that "$D_b$" can be expressed as "$D_a+1$".

As described above, the data described in the BNF causes addition and multiplication based on each rule, and therefore when all items of data are expanded, a very enormous amount of sentence examples are generated. Although an enormous amount of sentence examples are generally necessary to generate a training model, it is concerned that, when training is newly performed to use an already generated model for some use, if training data is enormous, a training time is taken too much, and the training model lacks practicality.

Therefore, in step S1, the training apparatus 100 accepts designation related to expansion from the setter 20. In an example, the training apparatus 100 accepts designation (denoted as "$D_{expected}$") of the number of items of training data (the number of samples) expected by the setter 20. In other words, the training apparatus 100 accepts designation of the number of times of expansion related to language data.

Furthermore, the training apparatus 100 adds a certain restriction to the polynomial used for the expansion, and thereby calculates the number of times of expansion as the total number of times of expansion designated by the setter 20. More specifically, the training apparatus 100 introduces expansion coefficients "$R_a$" and "$R_b$" for restricting the number of options derived by each rule by a certain multiplier.

The polynomial whose total number of times of expansion is adjusted using the expansion coefficients is expressed by following equation (1).

$$D_{expected} = D_a * R_a + D_a^3 * R_a^3 + D_b * R_b * D_a * R_a \qquad (1)$$
$$= D_a * R_a + D_a^3 * R_a^3 + (D_a * R_a + 1) * R_b * D_a$$

Since "$D_a$" and "$D_b$" are constants in equation (1), the training apparatus 100 may determine the expansion coefficients "$R_a$" and "$R_b$" such that a value of the number of times of expansion "$D_{expected}$" designated by the setter 20 becomes the closest to the designated number. Note that, in equation (1), the rule A is also included in expansion of the rule B when the sentence example Z is expanded, and the expansion coefficients for the rule A also influence the number of times of expansion of the rule B. Therefore, when the expansion coefficients are introduced, "$D_b$" is expressed as "$D_a*R_a+1$" as indicated in equation (1).

When accepting designation of the total number of times of expansion from the setter 20, the training apparatus 100 determines expansion coefficients "$R_a$" and "$R_b$" in equation (1), and executes expansion at a designated total number of times of expansion. In a case where, for example, a specific numerical value such as "2000" is designated as "$D_{expected}$", the training apparatus 100 determines specific values of "$R_a$" and "$R_b$" such that the solution of equation (1) becomes 2000. At this time, the training apparatus 100 may follow a constraint condition such as "$R_a=R_b$" to evenly expand all the rules according to the number of options. Note that, in a case where "$R_a$" and "$R_b$" cannot be analytically solved, the training apparatus 100 calculates an approximate value using a gradient descent method or the like.

Back to FIG. 1, processing after step S4 will be described. The training apparatus 100 expands the data in a state where expansion of each rule is finally restricted by the expansion coefficients using equation (1), and trains the utterance discriminator 50 using the generated sentences (step S5).

For example, as indicated in a graph 60, the training apparatus 100 trains the utterance discriminator 50 such that the utterance discriminator 50 becomes a discriminator that discriminates whether an input utterance corresponds to an intention "make sure that the door is locked" ("○" indicated in the graph 60) or does not correspond to the intention ("x" indicated in the graph 60).

Subsequently, the training apparatus 100 accepts an utterance of the user 70 via the user terminal 75 (step S6). The training apparatus 100 inputs the utterance of the user 70 to the trained utterance discriminator 50, and returns to the user 70 a result obtained by determining whether the utterance indicates a positive emotion or a negative emotion (step S7).

As described above, the training apparatus 100 acquires language data described in a format such as a Context-Free Grammar (CFG) like the BNF in which elements constituting a sentence can be replaced, and accepts from the setter 20 designation of a method (such as designation of the total number of times of expansion) for expanding the language data and creating sentences. Furthermore, the training apparatus 100 trains the utterance discriminator 50 that is a model related to a natural language using sentences created by expanding the language data based on the accepted designation.

Consequently, the training apparatus 100 can use data described in the BNF or the like as training data for new training of a natural language model already trained by another method such as Transformer. Furthermore, the training apparatus 100 can arbitrarily adjust the balance between a training time and accuracy by accepting designation of the total number of times of expansion and the like from the setter 20. More specifically, the training apparatus 100 can use, for training, sentences the number of which corresponds to a number designated by the setter 20 instead of learning an enormous amount of sentences obtained by expanding all items of data, so that it is possible to train the utterance discriminator 50 within the training time and at accuracy desired by the setter 20. That is, the training apparatus 100 can efficiently perform training using data described according to a predetermined grammatical rule.

1-2. Configuration of Training Apparatus According to First Embodiment

Figure 3:
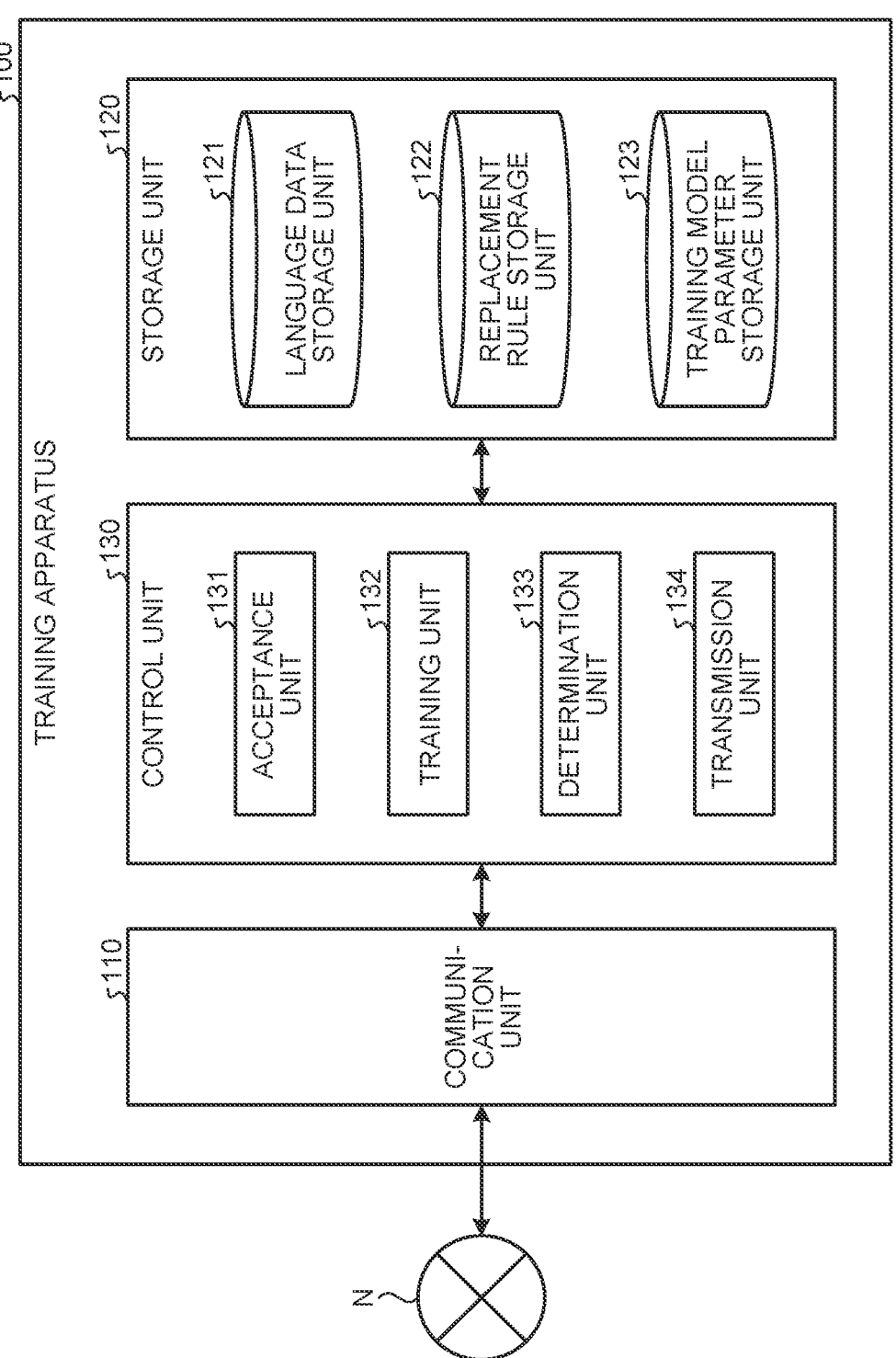
FIG. 3 is a view illustrating a configuration example of a training apparatus according to the first embodiment.

Next, a configuration of the training apparatus 100 will be described. FIG. 3 is a view illustrating the configuration example of the training apparatus 100 according to the first embodiment.

As illustrated in FIG. 3, the training apparatus 100 includes a communication unit 110, a storage unit 120, and a control unit 130. Note that the training apparatus 100 may include an input unit (e.g., a keyboard, a mouse, or the like) that accepts various operations from an administrator or the like who manages the training apparatus 100, and a display unit (e.g., a liquid crystal display or the like) for displaying various pieces of information.

The communication unit 110 is implemented as, for example, a Network Interface Card (NIC) or the like. The communication unit 110 is connected with a network N (e.g., the Internet) by wired or wireless connection, and transmits and receives information to and from the setter terminal 10 and the user terminal 75 via the network N.

The storage unit 120 is implemented as, for example, a semiconductor memory element such as a Random Access Memory (RAM) or a flash memory, or a storage apparatus such as a hard disk or an optical disk. The storage unit 120 includes a language data storage unit 121, a replacement rule storage unit 122, and a training model parameter storage unit 123. Hereinafter, each storage unit will be described in order.

As illustrated in FIG. 4, the language data storage unit 121 stores language data used for training processing. The language data corresponds to, for example, the utterance example 30 illustrated in FIG. 1. FIG. 4 is a view illustrating an example of the language data storage unit 121 according to the first embodiment. In the example illustrated in FIG. 4, the language data storage unit 121 includes items such as a "sentence ID", a "corresponding intention", and a "sentence body". Note that FIGS. 4 and 5 conceptually illustrate information stored in the storage unit 120 as "A01" or "G01", each information described later is actually stored in the storage unit 120.

The "sentence ID" is discrimination information for discriminating individual language data. The "corresponding intention" indicates to which intention the sentence needs to be associated as a sentence example and learned. The "sentence body" indicates information on a sentence itself of a certain natural language that may include a replaceable element (rule ID).

Next, the replacement rule storage unit 122 will be described. FIG. 5 is a view illustrating an example of the replacement rule storage unit 122 according to the first embodiment. As illustrated in FIG. 5, the replacement rule storage unit 122 stores replacement contents of replaceable elements of sentences that become training data. In the example illustrated in FIG. 5, the replacement rule storage unit 122 includes items such as a "rule ID" and "derived contents". For example, the replacement rule storage unit 122 corresponds to the BNF rule 40 illustrated in FIG. 1. Note that, although the embodiment describes the BNF rule as an example, the replacement rule storage unit 122 may store information related to rules of other grammatical rules.

The "rule ID" is discrimination information for discriminating a replaceable element. The "derived contents" includes information indicating to which option and junction the replaceable element can be expanded.

Next, the training model parameter storage unit 123 will be described. The training model parameter storage unit 123 stores weight information of a training result associated with a model used for the discriminator. The training apparatus 100 updates the weight according to calculation of the model at the time of training. Specific examples of the model of the discriminator include discrimination by Transformer alone, a combination of Transformer and logistic regression, a combination of a weight of a result of the RNN and logistic regression, and the like.

Back to FIG. 3, the description will be continued. The control unit 130 is implemented by, for example, a Central Processing Unit (CPU), a Micro Processing Unit (MPU), a Graphics Processing Unit (GPU), or the like by executing a program (e.g., a training program according to the present disclosure) stored in the training apparatus 100 using a Random Access Memory (RAM) or the like as a working area. Furthermore, the control unit 130 is a controller, and may be implemented as, for example, an integrated circuit such as an Application Specific Integrated Circuit (ASIC) or a Field Programmable Gate Array (FPGA).

An acceptance unit 131 acquires language data obtained by describing elements constituting a sentence in a replaceable format, and accepts designation of a method for expanding the language data and creating sentences.

The language data obtained by describing the elements constituting the sentences in a replaceable format is, for example, utterance examples described in the BNF. That is, for the language data described according to the BNF, the acceptance unit 131 accepts designation of a method for expanding the language data and creating the sentences. For example, the acceptance unit 131 acquires the language data from the language data storage unit 121. Alternatively, the acceptance unit 131 may acquire language data that matches specific learning use from the setter terminal 10.

The acceptance unit 131 accepts designation of the number of sentences to be created by expanding the language data as an example of designation of a method for expanding the language data and creating sentences. In other words, the acceptance unit 131 accepts the total number of times of expansion of data described in the BNF. More specifically, the total number of times of expansion is a value to be substituted into "$D_{expected}$" indicated in equation (1).

Furthermore, the acceptance unit 131 may accept designation of a weight related to expansion per rule associated with each element included in the language data.

The example has been described with reference to FIG. 1 where the training apparatus 100 determines the expansion coefficients "$R_a$" and "$R_b$" under a condition such as "$R_a$=$R_b$" to evenly expand all the rules in the sentence examples according to the number of options. However, some sentence examples may include a mixture of a large number of elements that the setter 20 needs to expand, and a small number of elements that the setter 20 needs to expand. In such a case, the setter 20 sets high expansion coefficients related to a certain element, and sets low expansion coefficients related to other elements. In other words, the setter 20 sets a higher weight related to the expansion of the certain element, and sets a lower weight related to expansion of the other elements. More specifically, in a case where the setter 20 considers that "{HOUSE}" is not important in training, but "{ROOM}" is important in the data "make sure that the door of {ROOM} of {HOUSE} is locked", small expansion coefficients related to "{HOUSE}" are set, and high expansion coefficients related to "{ROOM}" are set.

A training unit 132 trains the model related to the natural language using the sentences created by expanding the language data based on the designation accepted by the acceptance unit 131. The model related to the natural language is, for example, an utterance discriminator that discriminates an utterance intention. Note that, although the present disclosure describes the utterance discriminator as the example of the model related to the natural language, the model related to the natural language is not limited to the utterance discriminator, and may be a generator or the like that generates a response to an utterance.

In a case where, for example, the designation of the number of sentences created by expanding the language data is accepted, the training unit 132 trains the model using the sentences created by expanding the language data based on the designation of the number of sentences. More specifically, in a case where designation of a value to be substituted in "$D_{expected}$" indicated in equation (1) is accepted, the training unit 132 determines the expansion coefficients "$R_a$" and "$R_b$" of equation (1) such that the expansion coefficients "$R_a$" and "$R_b$" approximate the value. Furthermore, the training unit 132 expands the data with the number of times of expansion multiplied with the determined expansion coefficients, and acquires the sentences to be used as the training data. Subsequently, the training unit 132 trains (updates) the utterance discriminator 50 using the acquired sentences.

Furthermore, when the designation of the weight related to the expansion is accepted from the setter 20, the training unit 132 trains the model using the sentences created by expanding the language data based on this weight. More specifically, the training unit 132 substitutes in equation (1) the expansion coefficients "$R_a$" and "$R_b$" determined according to the weights, and expands the language data. Furthermore, the training unit 132 trains (updates) the utterance discriminator 50 using the expanded sentences. Consequently, the training unit 132 can acquire training data that meets the intention desired by the setter 20, so that it is possible to create a model that meets the purpose desired by the setter 20 more.

Furthermore, the training unit 132 may weight expansion per element according to the number of characters of features constituting the replacement target element included in the language data, and expand the language data. The number of characters of the element is, for example, an average of the numbers of characters among options derived by the rule associated with the element. In the example in FIG. 2, the average of the numbers of characters in the element "{HOUSE}" is determined by calculating the average of the numbers of characters of options such as " あたしんち (five characters)" (my house) and "いえ (two characters)" (house). Assuming that, for example, the average of the numbers of characters of the element "{HOUSE}" is "four" and the average of the numbers of characters of the element "{ROOM}" is "six", the training unit 132 determines the expansion coefficients for each element at a ratio of "4:6". The reason for this calculation is that it is assumed that a larger number of characters is highly likely to become a phrase having a greater influence on training. That is, the training unit 132 can perform training with higher accuracy by adjusting weights of expansion according to the number of characters, so that it is possible to efficiently perform training.

Furthermore, the training unit 132 may classify each element included in the language data based on similarity of features constituting the element, extract the features in order from a classified group, and thereby create sentences obtained by expanding the language data. That is, the training unit 132 prioritizes and performs expansion of each rule to increase variance as much as possible.

Figure 6:
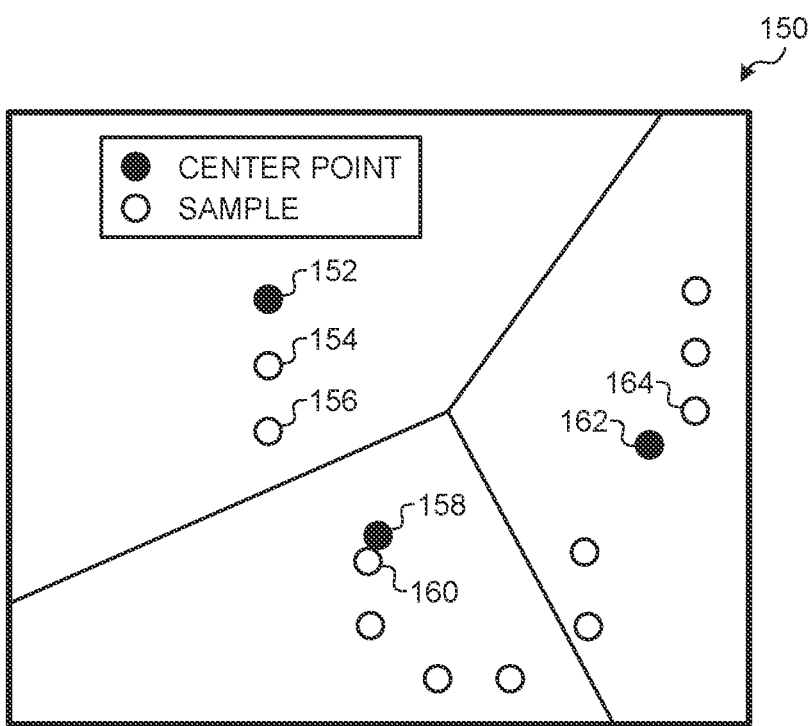
FIG. 6 is a view (2) for describing expansion processing according to the first embodiment.

This point will be described with reference to FIG. 6. FIG. 6 is a view (2) for describing expansion processing according to the first embodiment. A graph 150 in FIG. 6 schematically illustrates a state where rule derived options are classified (clustering) according to expansion coefficients.

An example of a clustering method will be described below. First, the training unit 132 calculates feature values of junctions (i.e., words or phrases) of the rule derived options. For example, the training unit 132 calculates "Bag of chars" as the feature value of an expansion result for a rule. "Bag of chars" described here indicates a vector having the number of times of appearance of each character included in the feature as one element. Note that, if the feature value of each word or phrase can be obtained, the training unit 132 may calculate the feature value using not only "Bag of chars", but also methods such as "CBOW" and "Skip-gram". Subsequently, the training unit 132 multiplies the number of rule derived options and the expansion coefficients, determines the real number of times of expansion of the rule, and performs k-means clustering assuming that the real number of times of expansion is k.

The example in FIG. 6 assumes that the training unit 132 determines k of k-means clustering, that is, the number of clusters as "three". In this case, the training unit 132 obtains clusters as indicated in the graph 150. More specifically, as illustrated in FIG. 6, the training unit 132 obtains a first cluster having a center point 152, a second cluster having a center point 158, and a third cluster having a center point 162. Note that, although a random number is usually used as an initial value of k-means, the result changes every time the feature value is calculated in this case, and therefore a method such as Var-Part for sequentially dividing clusters by a numerical value of a high order of variance, and creating initial clusters may be applied.

Furthermore, when expanding the rule, the training unit 132 selects unused junctions one by one from the generated clusters, and expands the selected junctions as character strings associated with the rule. More specifically, the training unit 132 selects and expands from the first cluster a feature 154 that is the closest junction to the center point 152 among the clusters. Next, the training unit 132 selects and expands from the second cluster a feature 160 that is the closest junction to the center point 158 among the clusters. Next, the training unit 132 selects and expands from the third cluster a feature 164 that is the closest junction to the center point 162 among the clusters. Subsequently, the training unit 132 selects and expands from the first cluster a feature 156 that is the second closest junction to the center point 152 next to the feature 154 among the clusters. That is, the training unit 132 sorts an expansion result in each cluster in advance in order of each cluster close to the center point, and adopts the expansion results in order of each cluster close to the center point. Furthermore, once the training unit 132 selects a feature in the same cluster, the training unit 132 does not use the selected features until the training unit 132 uses all features in the same cluster for expansion results. Consequently, when expanding the rule, the training unit 132 can suppress a decrease in variance of the feature value of the training data caused when similar features are intensively selected.

For example, "my home" and "home" of the element "{HOUSE}" illustrated in FIG. 2 have extremely high similarity, have no difference in feature values of generated sentence examples even if these elements are continuously expanded, and may not be appropriate as the training data. Therefore, as illustrated in FIG. 6, the training unit 132 clusters features of each rule according to a feature value (i.e., similarity), and performs expansion by a method for selecting features in order of each cluster. Consequently, the training unit 132 can efficiently acquire sentence examples including features having dispersed feature values, so that it is possible to perform highly accurate training with a relatively small amount of training data.

A determination unit 133 determines an utterance intention using the utterance discriminator trained by the training unit 132. For example, the determination unit 133 inputs a user's utterance intention acquired via the user terminal 75 to the utterance discriminator, and determines the utterance intention based on an output result. Note that the determination unit 133 may determine not only the utterance intention, but also various results according to the utterance discriminator (model) trained by the training unit 132. For example, the determination unit 133 may perform Automatic Speech Recognition (ASR) processing or other Natural Language Understanding (NLU) processing. For example, the determination unit 133 may discriminate an important word or phrase in an utterance sentence. For example, the determination unit 133 decomposes an acquired voice into morphemes by performing ASR or NLU, and determines what kind of intention or attribute each morpheme has.

A transmission unit 134 transmits various pieces of information. For example, the transmission unit 134 transmits a determination result of the determination unit 133 to the user terminal 75. Furthermore, the transmission unit 134 may transmit a result of expansion performed based on the designation accepted from the setter 20, a training result, and the like to the setter terminal 10.

1-3. Procedure of Processing According to First Embodiment

Figure 7:
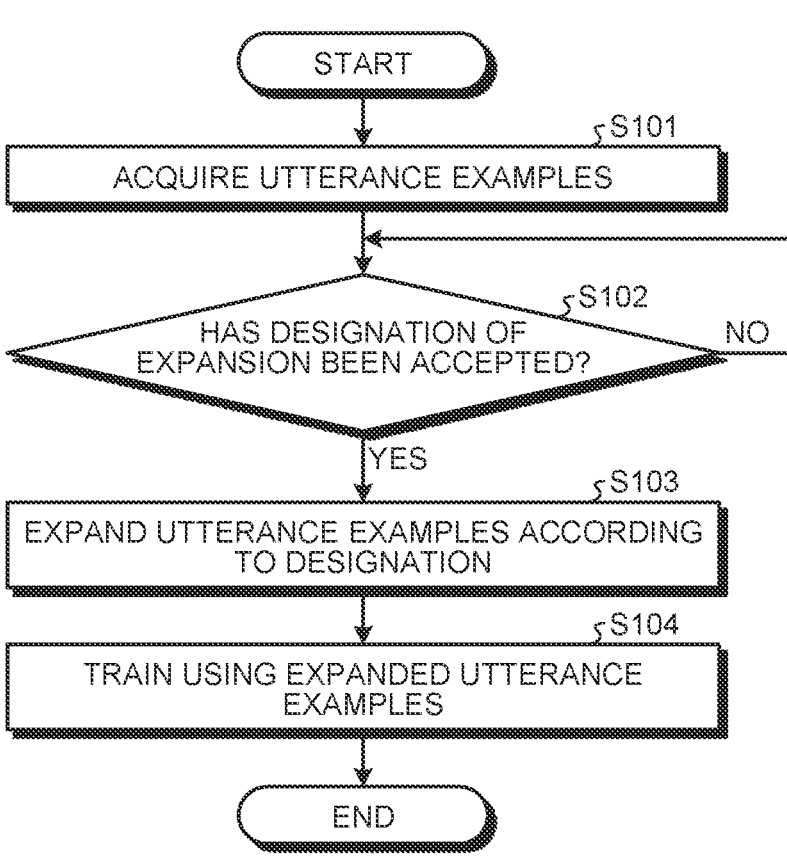
FIG. 7 is a flowchart (1) illustrating a flow of processing according to the first embodiment.
Figure 8:
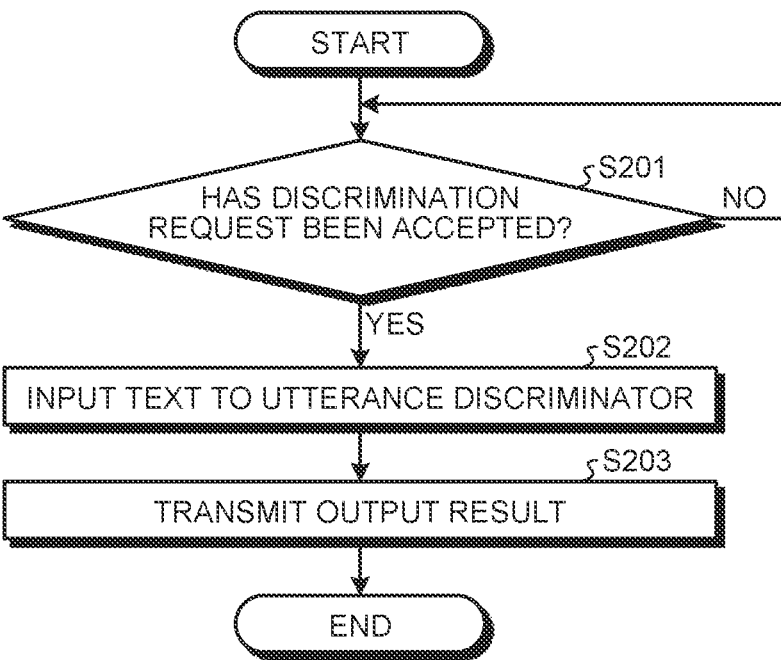
FIG. 8 is a flowchart (2) illustrating a flow of processing according to the first embodiment.

Next, the procedure of the processing according to the first embodiment will be described with reference to FIGS. 7 and 8. First, the procedure of training processing according to the first embodiment will be described with reference to FIG. 7. FIG. 7 is a flowchart (1) illustrating a flow of the processing according to the first embodiment.

As illustrated in FIG. 7, the training apparatus 100 acquires utterance examples used for training (step S101). Subsequently, the training apparatus 100 determines whether or not designation of expansion has been accepted from the setter 20 (step S102). In a case where the designation is not accepted (step S102; No), the training apparatus 100 stands by until accepting the designation.

On the other hand, in a case where the designation has been accepted (step S102; Yes), the training apparatus 100 expands the utterance examples according to the designation (step S103). For example, the training apparatus 100 expands the utterance examples based on the total number of times of expansion designated by the setter 20.

Furthermore, the training apparatus 100 trains the discriminator generated in advance by a method such as Transformer using the expanded utterance examples (step S104).

Next, the procedure of determination processing according to the first embodiment will be described with reference to FIG. 8. FIG. 8 is a flowchart (2) illustrating a flow of the processing according to the first embodiment.

The training apparatus 100 determines whether or not a request for discrimination on an utterance has been accepted from the user 70 (step S201). In a case where the request is not accepted (step S201; No), the training apparatus 100 stands by until accepting the request.

On the other hand, in a case where the request has been accepted (step S201; Yes), the training apparatus 100 inputs a text corresponding to the utterance acquired from the user 70 to the utterance discriminator 50 (step S202).

Subsequently, the training apparatus 100 acquires a discrimination result based on a result output from the utterance discriminator 50, and transmits the acquired result to the user 70 (step S203). Note that, in a case where the text acquired from the user 70 cannot be discriminated, or the like, the training apparatus 100 may transmit to the user 70 an error message or the like indicating a situation that the text cannot be discriminated.

1-4. Modified Example According to First Embodiment

The training processing according to the above-described first embodiment may be accompanied by various modifications. Hereinafter, the modified example of the first embodiment will be described.

The first embodiment has described the example where, when accepting designation of the total number of times of expansion from the setter 20, the training apparatus 100 sets the expansion coefficients and adjusts the number of times of expansion. Here, the training apparatus 100 may expand language data without setting the expansion coefficients.

For example, the training apparatus 100 may expand all items of language data, and extract sentences the number of which corresponds to the total number of times of expansion designated by the setter 20, at random from the expanded sentences. According to such a method, the training apparatus 100 does not need to determine the expansion coefficients, so that it is possible to improve a processing speed.

2. Second Embodiment

2-1. Outline of Information Processing According to Second Embodiment

Next, the second embodiment will be described. In the second embodiment, a training apparatus 100 provides a user interface to a setter 20, and accepts designation of settings via the user interface.

Figure 9:
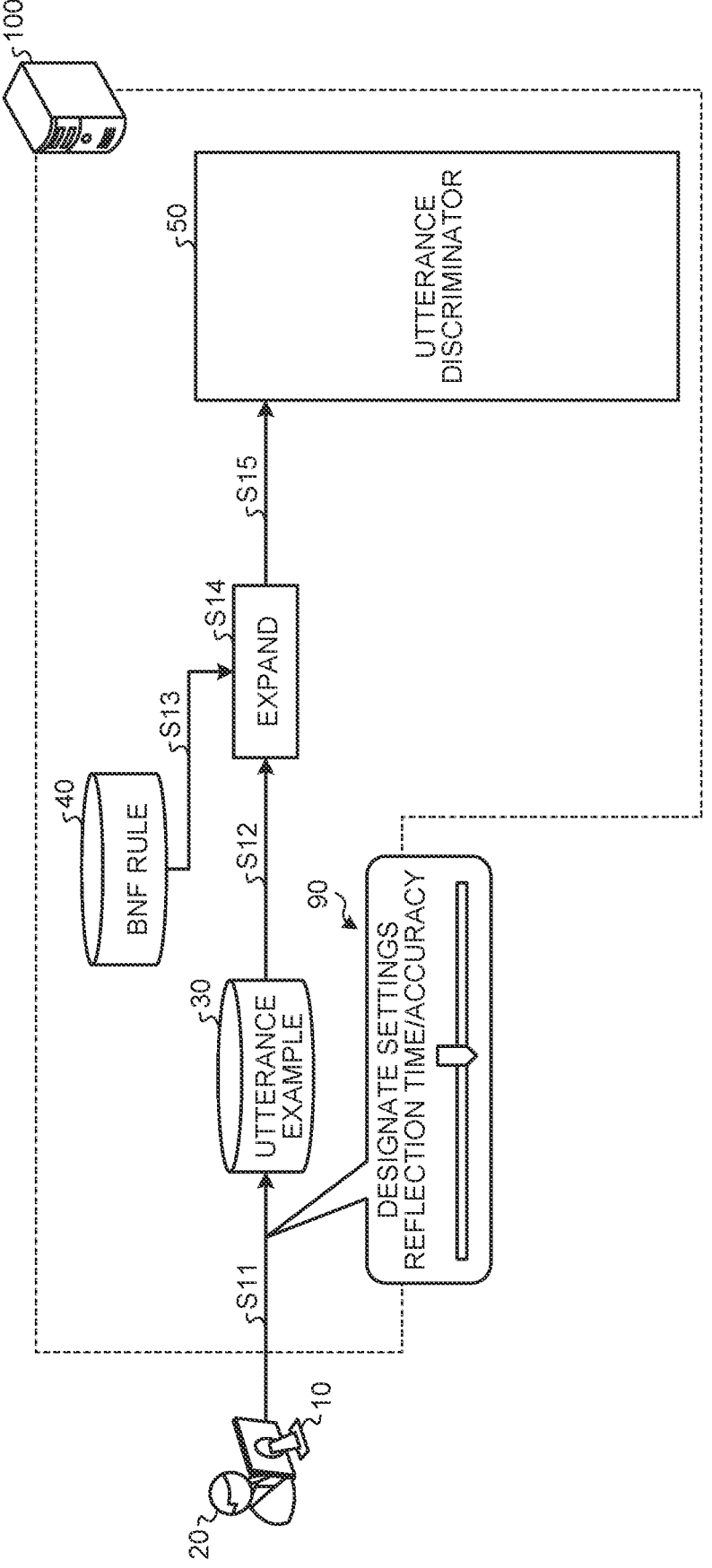
FIG. 9 is a view illustrating an outline of information processing according to a second embodiment.

FIG. 9 illustrates an outline of processing according to the second embodiment. In the example illustrated in FIG. 9, the training apparatus 100 provides a user interface 90 to the setter 20, and causes a setter terminal 10 to display the user interface 90.

The setter 20 designates a time (referred to as a "settings reflection time") related to training of an utterance discriminator 50 or accuracy of the utterance discriminator 50 via the user interface 90 (step S11).

For example, the setter 20 designates the settings reflection time or the accuracy by moving a slider displayed on the user interface 90. For example, the setter 20 can designate a longer settings reflection time or higher accuracy. Alternatively, the setter 20 can designate a shorter or longer settings reflection time or lower accuracy.

The training apparatus 100 acquires utterance examples 30 and a BNF rule (steps S12 and S13), and then determines the total number of times of expansion of the utterance examples 30 according to the settings reflection time designated by the setter 20 or the accuracy as a guide (step S14). More specifically, in a case where the long settings reflection time or the high accuracy is designated, the training apparatus 100 expands the utterance examples 30 such that the total number of times of expansion becomes relatively large. Alternatively, in a case where the short settings reflection time or the low accuracy is designated, the training apparatus 100 expands the utterance examples 30 such that the total number of times of expansion becomes relatively small. Note that processing of determining the number of times of expansion per element from the total number of times of expansion is similar to the processing in the first embodiment. That is, in a case where the setter 20 designates the long settings reflection time, the training apparatus 100 adjusts the number of times of expansion by determining relatively large values for expansion coefficients. Alternatively, in a case where the setter 20 designates the short settings reflection time, the training apparatus 100 adjusts the total number of times of expansion by determining relatively small values for the expansion coefficients. Furthermore, the training apparatus 100 trains the utterance discriminator 50 based on sentences generated by expanding the utterance examples 30. To determine the corresponding total number of times of expansion from the accuracy as the guide, information on a relationship between the total number of times of expansion and accuracy evaluated in advance based on a pair of existing representative language data and evaluation data for another purpose is used.

Thus, the training apparatus 100 according to the second embodiment accepts the designation of the expansion from the setter 20 via the user interface 90. Consequently, the setter 20 can intuitively designate expansion without inputting a specific numerical value of the total number of times of expansion, so that it is possible to perform training by a simple procedure. Note that the training apparatus 100 may display together with the slider in the user interface 90 a training end time or the like estimated in a case where training is performed based on designation of the setter 20.

2-2. Configuration of Training Apparatus According to Second Embodiment

Since the functional configuration of the training apparatus 100 according to the second embodiment is similar to that of the first embodiment, illustration thereof is omitted. Hereinafter, only a processing configuration different from that of the first embodiment will be described.

An acceptance unit 131 in a control unit 130 according to the second embodiment accepts designation of a training time when training is performed using sentences created by expanding language data. For example, the acceptance unit 131 accepts the designation of the training time from the setter 20 via the user interface 90. Furthermore, a training unit 132 trains the utterance discriminator 50 using the sentences created by expanding the language data based on the designation of the training time.

Furthermore, the acceptance unit 131 accepts designation of accuracy estimated in the utterance discriminator 50 trained by the training unit 132. The training unit 132 trains the utterance discriminator 50 using the sentences created by expanding the language data based on the designation of the accuracy.

Furthermore, the acceptance unit 131 may accept a request of the setter 20 for determination to the utterance discriminator 50 trained by the training unit 132 based on the designation of the accuracy, and then accept designation to improve the accuracy estimated in the model to be further trained by the training unit 132 as a response from the setter 20 to the determination. In this case, the training unit 132 further trains the utterance discriminator 50 using the sentences created by expanding the language data based on the designation to improve the accuracy.

That is, the acceptance unit 131 accepts the designation of the accuracy from the setter 20 once, then presents the utterance discriminator 50 trained based on the designation on the user interface 90 to the setter 20, and accepts input of an utterance from the setter 20. Furthermore, the acceptance unit 131 accepts a response indicating that the setter 20 needs to improve the accuracy a little more, on the user interface 90 from the setter 20 who has input the utterance.

For example, the acceptance unit 131 causes the user interface 90 to display a button such as "continue training more", makes the setter 20 press the button, and thereby accepts the response. In this case, assuming that the setter 20 desires to further improve the accuracy, the acceptance unit 131 determines to use more sentences as training data. Furthermore, the training unit 132 performs expansion a great number of times compared to the previous number of times of expansion, and trains the utterance discriminator 50. For example, the training unit 132 may set in advance the number of sentences to expand to 100, 200, 400, and the like stepwise, and sequentially increase the number of sentences used for training according to the response from the setter 20. Furthermore, in this case, the training unit 132 may enable the setter 20 to try to discriminate an utterance using the utterance discriminators 50 of the last number of times of expansion even during sequential learning. Furthermore, since training the utterance discriminator 50 takes time in proportion to the number of several utterance examples (sentences), the training unit 132 may cause the user interface 90 to display a time indication such as "until next accuracy improvement, 00 more minutes". This point will be described with reference to FIGS. 10 and 11.

Figure 10:
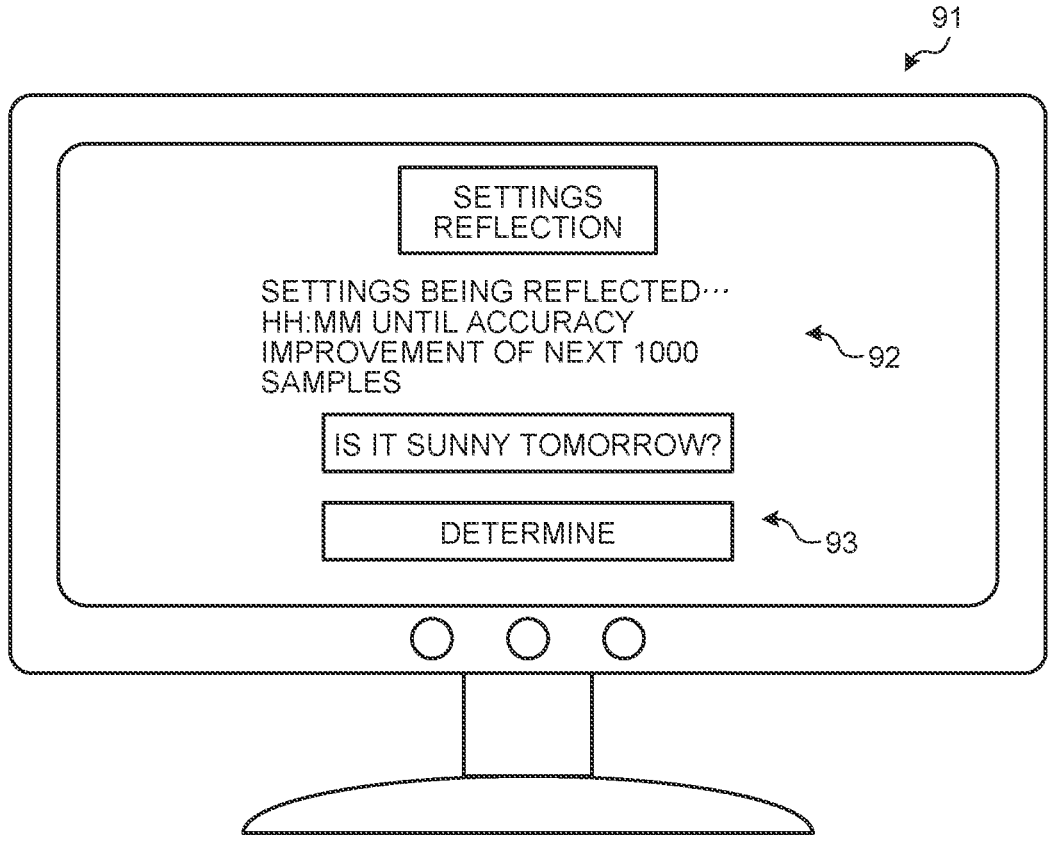
FIG. 10 is a view (1) for describing expansion processing according to the second embodiment.

FIG. 10 is a view (1) for describing expansion processing according to the second embodiment. The example illustrated in FIG. 10 indicates an example where a screen 91 of the setter terminal 10 displays an indication 92 of "settings being reflected . . . HH:MM until accuracy improvement of next 1000 samples", a sentence "is it sunny tomorrow?" input by the setter 20 to try the utterance discriminator 50, and a determination button 93.

That is, the example of the screen 91 illustrated in FIG. 10 indicates a state where the training apparatus 100 further performs training using 1000 sentences based on designation from the setter 20. At this time, the setter 20 can grasp a remaining training time (HH indicates an hour, and MM indicates minutes) from "HH:MM" in the indication 92.

Furthermore, in a case where the setter 20 needs to test accuracy of the utterance discriminator 50 before training using 1000 samples, the setter 20 can grasp the current accuracy of the utterance discriminator 50 by inputting an arbitrary sentence and pressing the determination button 93.

Figure 11:
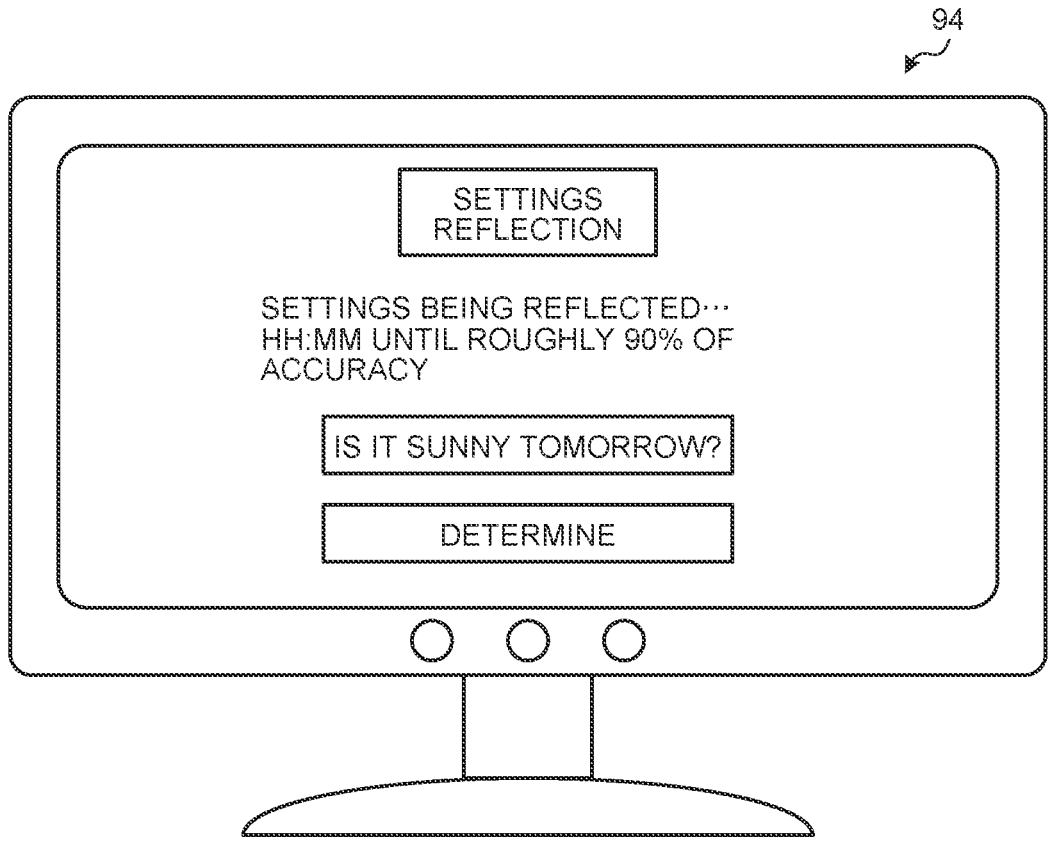
FIG. 11 is a view (2) for describing the expansion processing according to the second embodiment.

Another example will be described with reference to FIG. 11. FIG. 11 is a view (2) for describing expansion processing according to the second embodiment. An example illustrated in FIG. 11 indicates an indication such as "settings being reflected . . . HH:MM until roughly 90% of accuracy" on a screen 94 of the setter terminal 10. That is, the example of the screen 94 illustrated in FIG. 11 indicates a state where the training apparatus 100 is performing training for improving determination accuracy of the utterance discriminator 50 to 90% based on designation from the setter 20. At this time, similar to the example in FIG. 10, the setter 20 can grasp a remaining training time from "HH:MM" in the screen 94. Furthermore, similar to the example in FIG. 10, in a case where the setter 20 needs to try the utterance discriminator 50 before accuracy is improved, the setter 20 can grasp the current accuracy of the utterance discriminator 50 by inputting an arbitrary sentence and pressing a determination button.

Thus, the training apparatus 100 according to the second embodiment accepts the degree of accuracy of the utterance discriminator 50, designation of the number of sentences (i.e., the number of times of expansion) used for training, and the like from the setter 20 via the user interface 90. That is, the training apparatus 100 can cause the setter 20 to designate the accuracy of the utterance discriminator 50 and the time taken for training in detail, so that it is possible to improve usability related to training.

2-3. Procedure of Processing According to Second Embodiment

Figure 12:
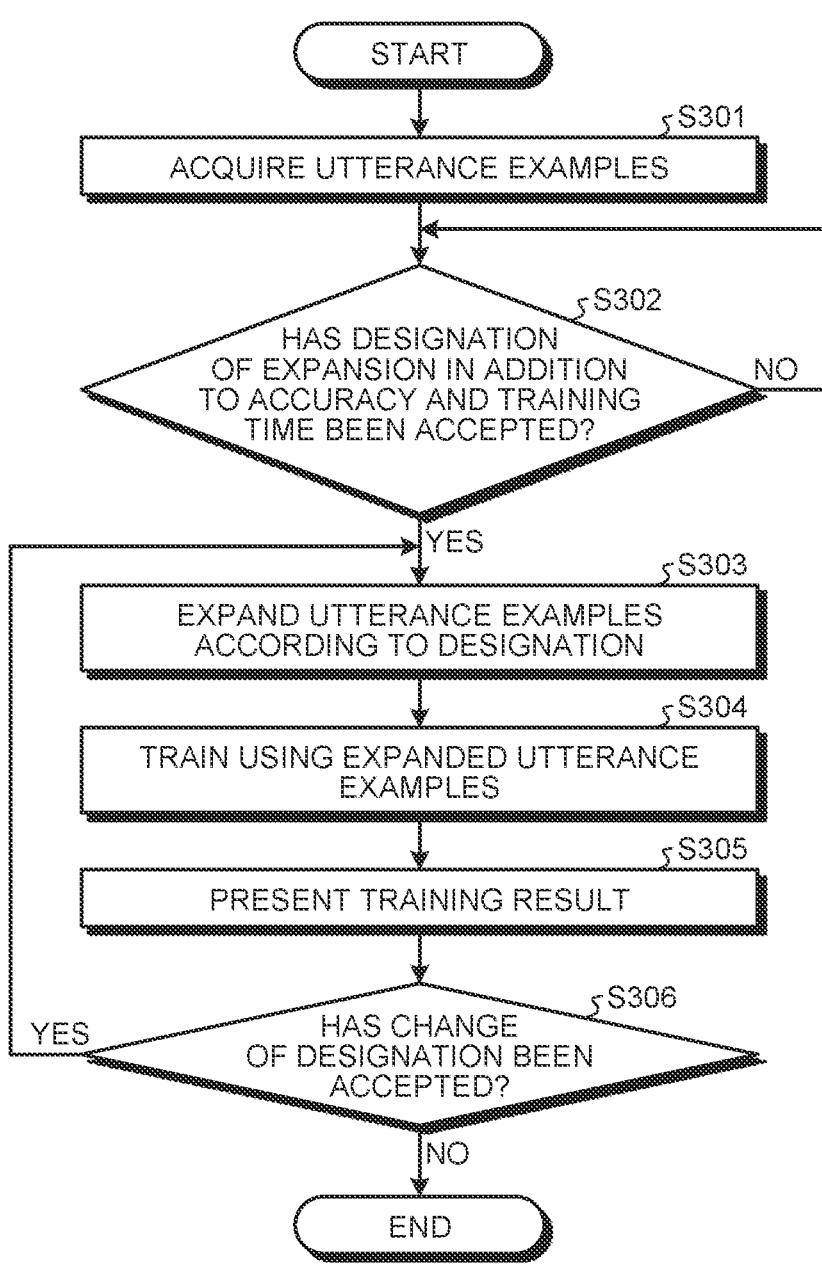
FIG. 12 is a flowchart illustrating a flow of processing according to the second embodiment.

Next, a procedure of processing according to the second embodiment will be described with reference to FIG. 12. FIG. 12 is a flowchart illustrating a flow of the processing according to the second embodiment.

As illustrated in FIG. 12, the training apparatus 100 acquires utterance examples used for training (step S301). Subsequently, the training apparatus 100 determines whether or not designation of expansion in addition to accuracy and the training time has been accepted from the setter 20 (step S302). In a case where the designation is not accepted (step S302; No), the training apparatus 100 stands by until accepting the designation.

On the other hand, in a case where the designation has been accepted (step S302; Yes), the training apparatus 100 expands the utterance examples according to the designation (step S303). Furthermore, the training apparatus 100 trains an utterance discriminator using the expanded utterance examples (step S304).

Subsequently, the training apparatus 100 presents the training result to the setter 20 (step S305). For example, the training apparatus 100 causes the user interface 90 to display the result or causes the utterance discriminator 50 in which the training result has been reflected to execute determination via the screen 91 or the screen 94, and thereby presents the training result to the setter 20.

Subsequently, the training apparatus 100 determines whether a change of designation has been accepted from the setter 20 (step S306). For example, the training apparatus 100 determines whether or not designation for improving accuracy of the utterance discriminator 50, designation for increasing the number of times of expansion of utterance examples, and the like have been newly accepted from the setter 20.

In a case where the change of the designation has been accepted (step S306; Yes), the training apparatus 100 returns to step S303, and expands the utterance examples according to the designation. On the other hand, in a case where the change of the designation is not accepted (step S306; No), the training apparatus 100 ends the training processing assuming that the request of the setter 20 has been achieved.

2-4. Modified Example According to Second Embodiment

The second embodiment has described the example where the training apparatus 100 accepts designation related to accuracy and the number of times of expansion from the setter 20. Furthermore, the example has been described where the training apparatus 100 presents to the setter 20 a result obtained by performing training with the designated number of times of expansion. Here, the training apparatus 100 may indicate a result of expansion, and then accept designation from the setter 20. This point will be described with reference to FIG. 13.

Figure 13:
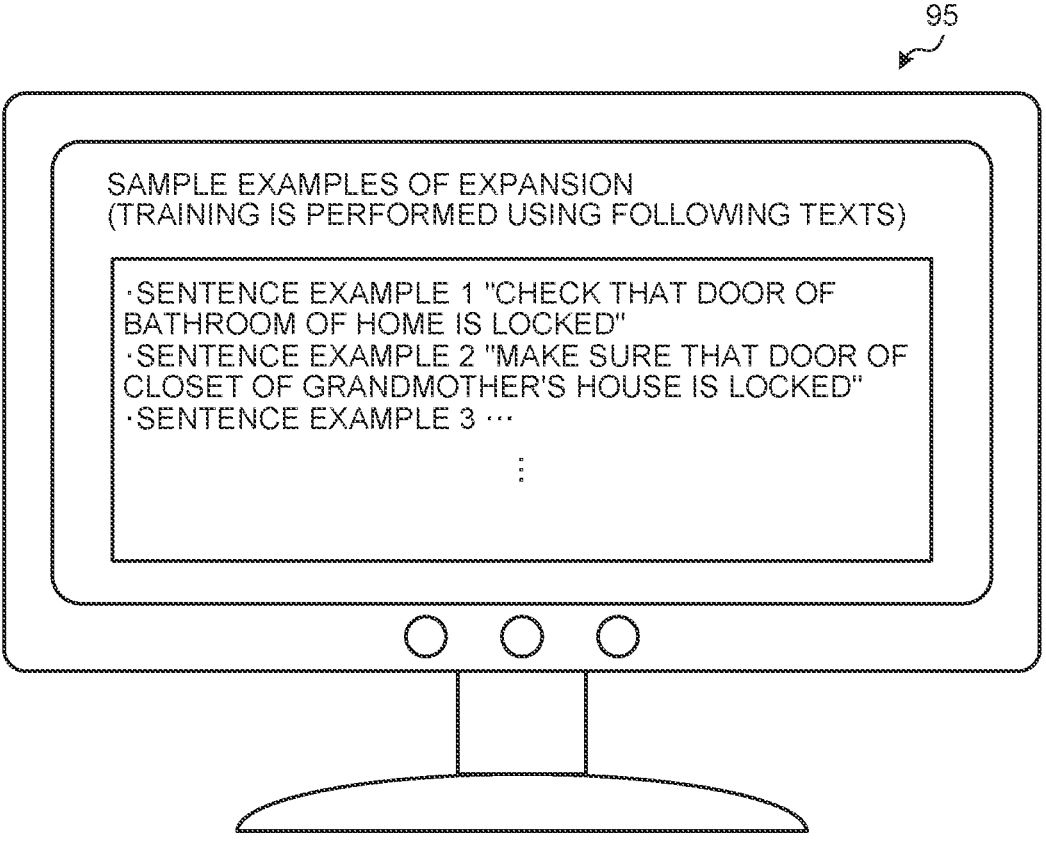
FIG. 13 is a view illustrating an example of information processing according to a modified example of the second embodiment.

FIG. 13 is a view illustrating an example of information processing according to a modified example of the second embodiment. The example illustrated in FIG. 13 indicates a state where the training apparatus 100 displays on a screen 95 examples of sentences created by expanding utterance examples.

In such an example, the training apparatus 100 acquires language data described in the BNF, then expands a predetermined number of items of the language data, and creates sentence examples. Furthermore, the training apparatus 100 displays the created sentence examples in a mode that can be recognized by the setter 20. For example, the training apparatus 100 creates a number of sentence examples that can be displayed in an arbitrary user interface (such as a display window) on the screen of the setter terminal 10, and displays the created sentence examples.

That is, the training apparatus 100 displays the result of expansion of the language data on the user interface used by the setter 20 who uses the utterance discriminator 50, and then accepts designation from the setter 20. Furthermore, the training apparatus 100 trains the utterance discriminator 50 using the sentences including the result of the expansion displayed on the user interface. As a result, the setter 20 can grasp in advance how many sentence examples are used for training and what sentence examples are used for training, so that it is possible to efficiently perform training.

Note that, in a case where sentences are expanded by being adjusted onto the screen of the setter terminal 10, when a display area is changed according to a size or a direction of the screen, enlargement, reduction, or the like, the training apparatus 100 may dynamically change the number of times of expansion according to the display area.

3. Other Embodiment

The processing according to each of the above-described embodiments may be carried out in various different embodiments in addition each of the above embodiments.

Each of the above embodiments has described the example where a user terminal 75 is a smartphone or the like. However, the user terminal 75 is not limited to the smartphone, and may be a device such as a smart speaker that has a function of recognizing an utterance of a user 70 and making a predetermined response. Furthermore, the user terminal 75 may be a wearable device such as a watch-type terminal or an eyeglass-type terminal. Furthermore, the user terminal 75 may be implemented as various smart devices having an information processing function. For example, the user terminal 75 may be smart home appliances such as televisions, air conditioners, or refrigerators, smart vehicles such as automobiles, drones, home robots, or the like.

Furthermore, although each of the above embodiments has described the example where a natural language model is trained and created by the method such as the RNN or Transformer, the training method is not limited thereto, and various known methods may be used.

Furthermore, it is possible to manually perform all or part of processing described as the processing that is automatically performed among respective processing described in each of the above embodiments, or automatically perform by a known method all or part of processing described as the processing that is manually performed. Furthermore, the processing procedures, the specific names, and information including the items of various data and parameters illustrated in the above description and drawings can be arbitrarily changed unless otherwise designated. For example, the various pieces of information illustrated in each drawing are not limited to the illustrated information.

Furthermore, each component of each apparatus illustrated in the drawings is functionally conceptual, and does not necessarily need to be physically configured as illustrated in the drawings. That is, the specific modes of distribution and integration of each apparatus are not limited to the illustrated modes, and all or part thereof can be functionally or physically distributed and integrated in an arbitrary unit according to various loads, usage conditions, and the like. For example, an acceptance unit 131 and a determination unit 133 may be integrated.

Furthermore, each of the above-described embodiments and modified examples can be appropriately combined within a range where the processing contents does not contradict each other.

Furthermore, the effects described in the description are merely examples and are not limited, and other effects may be provided.

4. Effect of Training Apparatus According to Present Disclosure

As described above, a training apparatus according to the present disclosure (a training apparatus 100 in the embodiment) includes an acceptance unit (the acceptance unit 131 according to the embodiment), and a training unit (the training unit 132 in the embodiment). The acceptance unit acquires language data (utterance examples or the like in the embodiment) obtained by describing elements constituting the sentences in a replaceable format, and accepts designation of a method for expanding the language data and creating sentences. The training unit trains a model (an utterance discriminator 50 in the embodiment) related to the natural language using sentences created by expanding the language data based on the designation accepted by the acceptance unit.

Thus, the training apparatus according to the present disclosure can use data described according to another grammatical rule as training data for new training of a natural language model created by an arbitrary method. That is, the training apparatus can use, for training, language data that is not normally available, so that it is possible to efficiently train a natural language model.

Furthermore, the acceptance unit accepts designation of the number of sentences created by expanding the language data. The training unit trains the model using the sentences created by expanding the language data based on the designation of the number of sentences.

Consequently, the training apparatus can use, for training, sentences the number of which corresponds to the number designated by the setter instead of learning an enormous amount of sentences obtained by expanding all items of data, so that it is possible to reduce the time taken for training.

Furthermore, the acceptance unit accepts designation of a weight related to expansion per replacement target element included in the language data. The training unit trains the model using sentences created by expanding the language data based on the designation of the weight related to the expansion.

Consequently, the training apparatus uses, for training, data obtained by performing adjustment of, for example, increasing the number of times of expansion for an element that the setter wants to emphasize, so that it is possible to create a model matching a setter's request.

Furthermore, the training unit weights expansion per element according to the numbers of characters of features constituting the replacement target elements included in the language data, and expands the language data.

Consequently, the training apparatus uses, for training, data obtained by intensively expanding elements that are assumed to be important for sentences and have large numbers of characters, so that it is possible to increase the possibility of creating a highly accurate model.

Furthermore, the training unit classifies each element included in the language data based on similarity of the features constituting each element, extracts features in order from a classified group, and thereby creates sentences obtained by expanding the language data.

Consequently, the training apparatus uses for training the data having the dispersed similarity of the sentences to be expanded and created, so that it is possible to increase the possibility of creating a highly accurate model.

Furthermore, the acceptance unit accepts designation of a training time when training is performed using the sentences created by expanding the language data. The training unit trains the model using the sentences created by expanding the language data based on the designation of the training time.

Consequently, the training apparatus can complete processing within a time matching the setter's request in a case of the training processing that generally requires a long time, so that it is possible to improve usability of the setter.

Furthermore, the acceptance unit accepts designation of accuracy estimated in the model trained by the training unit. The training unit trains the model using the sentences created by expanding the language data based on the designation of the accuracy.

Consequently, the training apparatus can create a model having accuracy that meets the setter's request.

Furthermore, the acceptance unit accepts a request for determination from the user to the model trained by the training unit based on the designation of accuracy, and then accepts, as a response from the user to the determination, designation to improve the accuracy estimated in the model to be further trained by the training unit. The training unit further trains the model using the sentences created by expanding the language data based on the designation to improve the accuracy.

Consequently, the training apparatus can end or continue the training processing according to setter's feedback, so that it is possible to create a model that meets the setter's request.

Furthermore, the acceptance unit displays a result of expansion of the language data on a user interface used by the user who uses the model, and then accepts designation from the user. The training unit trains the model using the sentences including the result of the expansion displayed on the user interface by the acceptance unit.

Consequently, the training apparatus performs training using the sentence examples recognized in advance by the user, so that it is possible to create a model that meets the user's request.

Furthermore, for the language data described according to the Backus-Naur Form (BNF), the acceptance unit accepts designation of a method for expanding the language data and creating sentences.

Consequently, the training apparatus can use for training the language data described according to the BNF rule, so that it is possible to efficiently acquire a relatively large number of utterance examples and smoothly advance training.

5. Hardware Configuration

Figure 14:
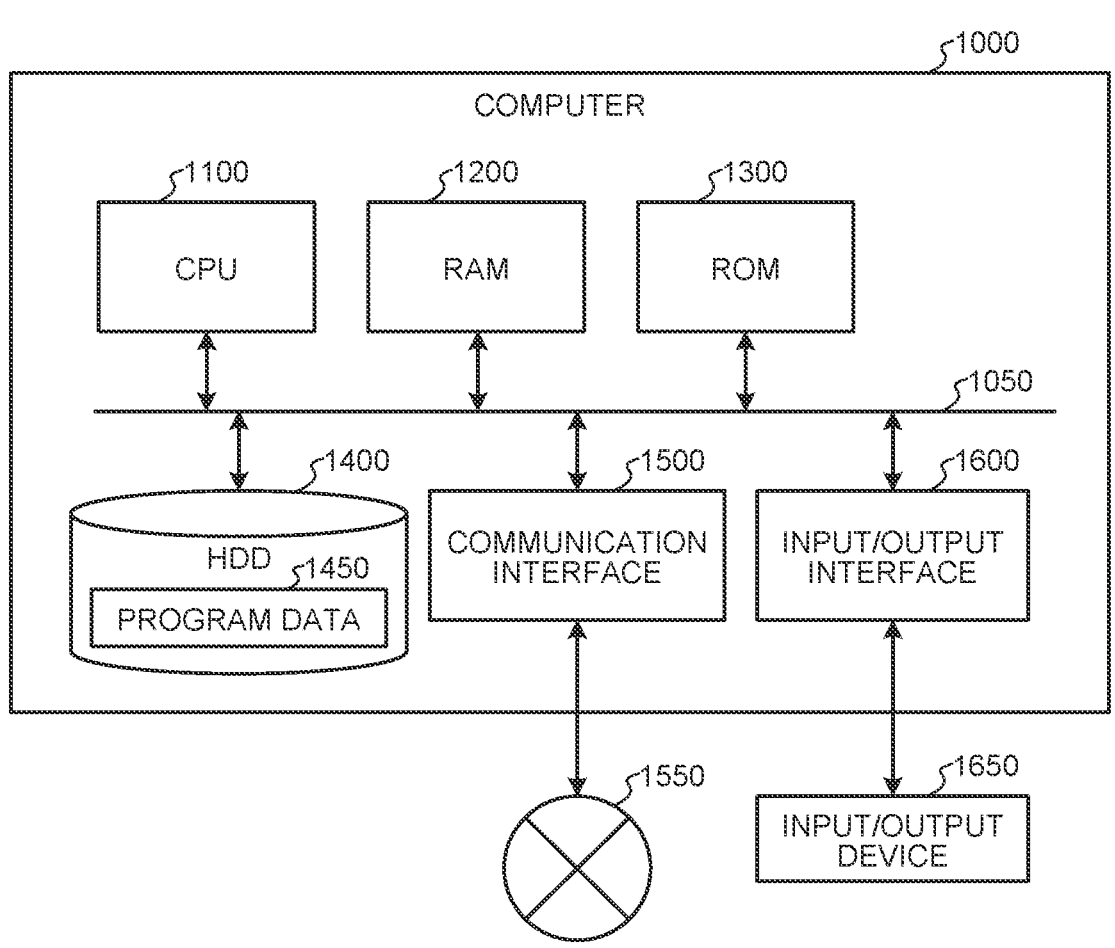
FIG. 14 is a hardware configuration diagram illustrating an example of a computer that implements functions of the training apparatus.

The training apparatus 100 according to each of the above-described embodiments is implemented as, for example, a computer 1000 employing a configuration as illustrated in FIG. 14. Hereinafter, the training apparatus 100 according to the present disclosure will be described citing an example. FIG. 14 is a hardware configuration diagram illustrating an example of the computer 1000 that implements the functions of the training apparatus 100. The computer 1000 includes a CPU 1100, a RAM 1200, a Read Only Memory (ROM) 1300, a Hard Disk Drive (HDD) 1400, a communication interface 1500, and an input/output interface 1600. Each unit of the computer 1000 is connected by a bus 1050.

The CPU 1100 operates based on a program stored in the ROM 1300 or the HDD 1400, and controls each unit. For example, the CPU 1100 expands in the RAM 1200 a program stored in the ROM 1300 or the HDD 1400, and executes processing corresponding to various programs.

The ROM 1300 stores a boot program such as a Basic Input Output System (BIOS) executed by the CPU 1100 when the computer 1000 is activated, a program that depends on hardware of the computer 1000, and the like.

The HDD 1400 is a computer-readable recording medium that non-transiently records a program executed by the CPU 1100, data used by this program, and the like. More specifically, the HDD 1400 is a recording medium that records a training program according to the present disclosure that is an example of program data 1450.

The communication interface 1500 is an interface for the computer 1000 to connect to an external network 1550 (e.g., the Internet). For example, the CPU 1100 receives data from another equipment, and transmits data generated by the CPU 1100 to the another equipment via the communication interface 1500.

The input/output interface 1600 is an interface for connecting an input/output device 1650 and the computer 1000. For example, the CPU 1100 accepts data from an input device such as a keyboard and a mouse via the input/output interface 1600. Furthermore, the CPU 1100 transmits data to an output device such as a display, a speaker, or a printer via the input/output interface 1600. Furthermore, the input/output interface 1600 may function as a media interface that reads a program or the like recorded in a predetermined recording medium (medium). The media are, for example, optical recording media such as a Digital Versatile Disc (DVD) and a Phase change rewritable Disk (PD), magneto-optical recording media such as a Magneto-Optical disk (MO), tape media, magnetic recording media, semiconductor memories, or the like.

In a case where, for example, the computer 1000 functions as the training apparatus 100 according to the first embodiment, the CPU 1100 of the computer 1000 implements the functions of the control unit 130 and the like by executing the training program loaded on the RAM 1200. Furthermore, the HDD 1400 stores the training program according to the present disclosure and data in the storage unit 120. Note that, although the CPU 1100 reads the program data 1450 from the HDD 1400 to execute, these programs may be acquired from another apparatus via the external network 1550 in another example.

Note that the technique according to the present disclosure can also employ the following configurations.

(1) A training apparatus comprising:
   an acceptance unit that acquires language data obtained by describing an element constituting a sentence in a replaceable form, and accepts designation of a method for expanding the language data and creating the sentence; and
   a training unit that trains a model related to a natural language using the sentence created by expanding the language data based on the designation accepted by the acceptance unit.

(2) The training apparatus according to (1), wherein
   the acceptance unit accepts designation of a number of sentences created by expanding the language data, and
   the training unit trains the model using a sentence created by expanding the language data based on the designation of the number of sentences.

(3) The training apparatus according to (1) or (2), wherein
   the acceptance unit accepts designation of a weight related to expansion per replacement target element included in the language data, and
   the training unit trains the model using a sentence created by expanding the language data based on the designation of the weight related to the expansion.

(4) The training apparatus according to any one of (1) to (3), wherein
   the training unit weights expansion per element according to a number of characters of a feature constituting the replacement target element included in the language data, and expands the language data.

(5) The training apparatus according to any one of (1) to (4), wherein
   the training unit classifies each element included in the language data based on similarity of a feature constituting each element, extracts features in order from a classified group, and thereby creates a sentence obtained by expanding the language data.

(6) The training apparatus according to any one of (1) to (5), wherein
   the acceptance unit accepts designation of a training time when training is performed using a sentence created by expanding the language data, and
   the training unit trains the model using the sentence created by expanding the language data based on the designation of the training time.

(7) The training apparatus according to any one of (1) to (6), wherein the acceptance unit accepts designation of accuracy estimated in the model trained by the training unit, and the training unit trains the model using a sentence created by expanding the language data based on the designation of the accuracy.

(8) The training apparatus according to (7), wherein the acceptance unit accepts a determination request from a user to the model trained by the training unit based on the designation of the accuracy, and then accepts, as a response from the user to the determination, designation to improve accuracy estimated in a model to be further trained by the training unit, and the training unit further trains the model using a sentence created by expanding the language data based on the designation to improve the accuracy.

(9) The training apparatus according to any one of (1) to (8), wherein the acceptance unit causes a user interface used by a user who uses the model to display a result obtained by expanding the language data, and then accepts the designation from the user, and the training unit trains the model using a sentence including the result of the expansion displayed on the user interface by the acceptance unit.

(10) The training apparatus according to any one of (1) to (9), wherein for the language data described according to a Backus-Naur Form (BNF), the acceptance unit accepts designation of a method for expanding the language data and creating a sentence.

(11) A training method comprising:

acquiring, by a computer, language data obtained by describing an element constituting a sentence in a replaceable form, and accepts designation of a method for expanding the language data and creating the sentence; and training, by the computer, a model related to a natural language using the sentence created by expanding the language data based on the accepted designation.

(12) A training program for causing a computer to function as:

an acceptance unit that acquires language data obtained by describing an element constituting a sentence in a replaceable form, and accepts designation of a method for expanding the language data and creating the sentence; and a training unit that trains a model related to a natural language using the sentence created by expanding the language data based on the designation accepted by the acceptance unit.

REFERENCE SIGNS LIST

1 TRAINING SYSTEM
10 SETTER TERMINAL
20 SETTER
50 UTTERANCE DISCRIMINATOR
70 USER
75 USER TERMINAL
100 TRAINING APPARATUS
110 COMMUNICATION UNIT
120 STORAGE UNIT
121 LANGUAGE DATA STORAGE UNIT
122 REPLACEMENT RULE STORAGE UNIT

123 TRAINING MODEL PARAMETER STORAGE UNIT
130 CONTROL UNIT
131 ACCEPTANCE UNIT
132 TRAINING UNIT
133 DETERMINATION UNIT
134 TRANSMISSION UNIT

The invention claimed is:

1. A training apparatus, comprising:

a Central Processing Unit (CPU) configured to:

acquire language data from a storage device, wherein the language data is associated with a plurality of elements, and the plurality of elements constitutes a plurality of sentences in a replaceable form;

receive designation of a method from a terminal device, wherein the designation is received for expansion of the language data and generation of the plurality of sentences;

generate expansion coefficients based on a machine learning algorithm and the received designation;

expand the language data based on a Backus-Naur Form (BNF) and the generated expansion coefficients;

generate training data based on the expansion of the language data, wherein the training data is associated with the plurality of sentences; and train a machine learning model related to a natural language, wherein the machine learning model is trained based on the generated training data.

2. The training apparatus according to claim 1, wherein the CPU is further configured to:

receive the designation of the method associated with a number of the plurality of sentences;

expand the language data based on the designation associated with the number of the plurality of sentences, wherein the language data is expanded to generate a sentence of the plurality of sentences; and train the machine learning model based on the generated sentence.

3. The training apparatus according to claim 1, wherein the CPU is further configured to:

receive the designation of the method associated with a weight related to expansion per replacement target element of the language data;

expand the language data based on the designation associated with the weight, wherein the language data is expanded to generate a sentence of the plurality of sentences; and train the machine learning model based on the generated sentence.

4. The training apparatus according to claim 3, wherein the CPU is further configured to:

weight expansion per element of the plurality of elements based on a number of characters of a feature that constitutes the replacement target element; and expand the language data based on the weighted expansion per element.

5. The training apparatus according to claim 1, wherein the CPU is further configured to:

classify each element of the plurality of elements based on similarity of features of a respective element of the plurality of elements;

extract the features in an order from a classified group based on the classified plurality of elements; and expand the language data based on the extracted features, wherein the language data is expanded to generate a sentence of the plurality of sentences.

6. The training apparatus according to claim 1, wherein the CPU is further configured to:

receive the designation of the method associated with a training time to train the machine learning model;

expand the language data based on the designation associated with the training time, wherein the language data is expanded to generate a sentence of the plurality of sentences; and train the machine learning model based on the sentence.

7. The training apparatus according to claim 1, wherein the CPU is further configured to:

accept the designation of the method associated with an accuracy to train the machine learning model;

expand the language data based on the designation associated with the accuracy, wherein the language data is expanded to generate a sentence of the plurality of sentences; and train the machine learning model based on the generated sentence.

8. The training apparatus according to claim 7, wherein the CPU is further configured to: receive a determination request from a user based on the training of the machine learning model, wherein the machine learning model is trained based on the designation associated with the accuracy receive a response from the user based on the determination request, wherein the response includes the designation of the method associated with improvement of the accuracy; expand the language data based on the designation associated with the improvement in the accuracy, wherein the language data is expanded to generate the sentence of the plurality of sentences; train the machine learning model a based on the generated sentence.

9. The training apparatus according to claim 1, wherein the CPU is further configured to:

control display of a user interface associated with a user of the machine learning model, wherein the user interface displays a result of the expansion of the language data;

receive the designation from the user based on the display of the user interface; and train the machine learning model based on a sentence of the plurality of sentences, wherein the sentence includes the result of the expansion of the language data.

10. A training method, comprising:

acquiring, by a computer, language data from a storage device, wherein the language data is associated with a plurality of elements, and the plurality of elements constitutes a plurality of sentences in a replaceable form;

receiving, by the computer, designation of a method from a terminal device, wherein the designation is received for expansion of the language data and generation of the plurality of sentences;

generating, by the computer, expansion coefficients based on a machine learning algorithm and the received designation;

expanding, by the computer, the language data based on a Backus-Naur Form (BNF) and the generated expansion coefficients;

generating, by the computer, training data based on the expansion of the language data, wherein the training data is associated with the plurality of sentences; and training, by the computer, a machine learning model related to a natural language, wherein the machine learning model is trained based on the generated training data.

11. A non-transitory computer-readable medium having stored thereon, computer-executable instructions which, when executed by a computer, cause the computer to execute operations, the operations comprising:

acquiring language data from a storage device, wherein the language data is associated with a plurality of elements, and the plurality of elements constitutes a plurality of sentences in a replaceable form;

receiving designation of a method from a terminal device, wherein the designation is received for expansion of the language data and generation of the plurality of sentences;

generating expansion coefficients based on a machine learning algorithm and the received designation;

expanding the language data based on a Backus-Naur Form (BNF) and the generated expansion coefficients;

generating training data based on the expansion of the language data, wherein the training data is associated with the plurality of sentences; and training a machine learning model related to a natural language, wherein the machine learning model is trained based on the generated training data.

\* \* \* \* \*